UNITED STATES PATENT OFFICE.

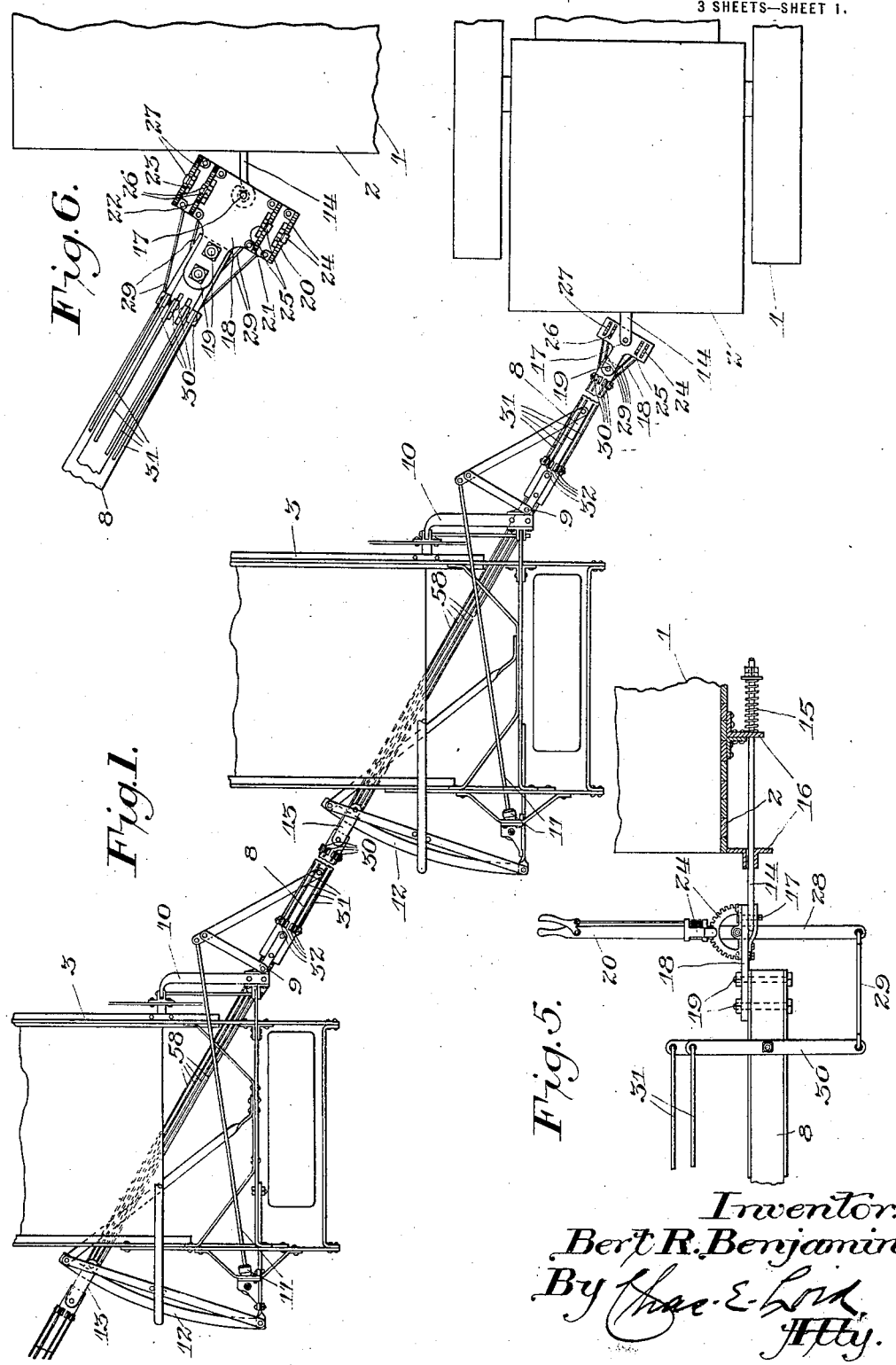

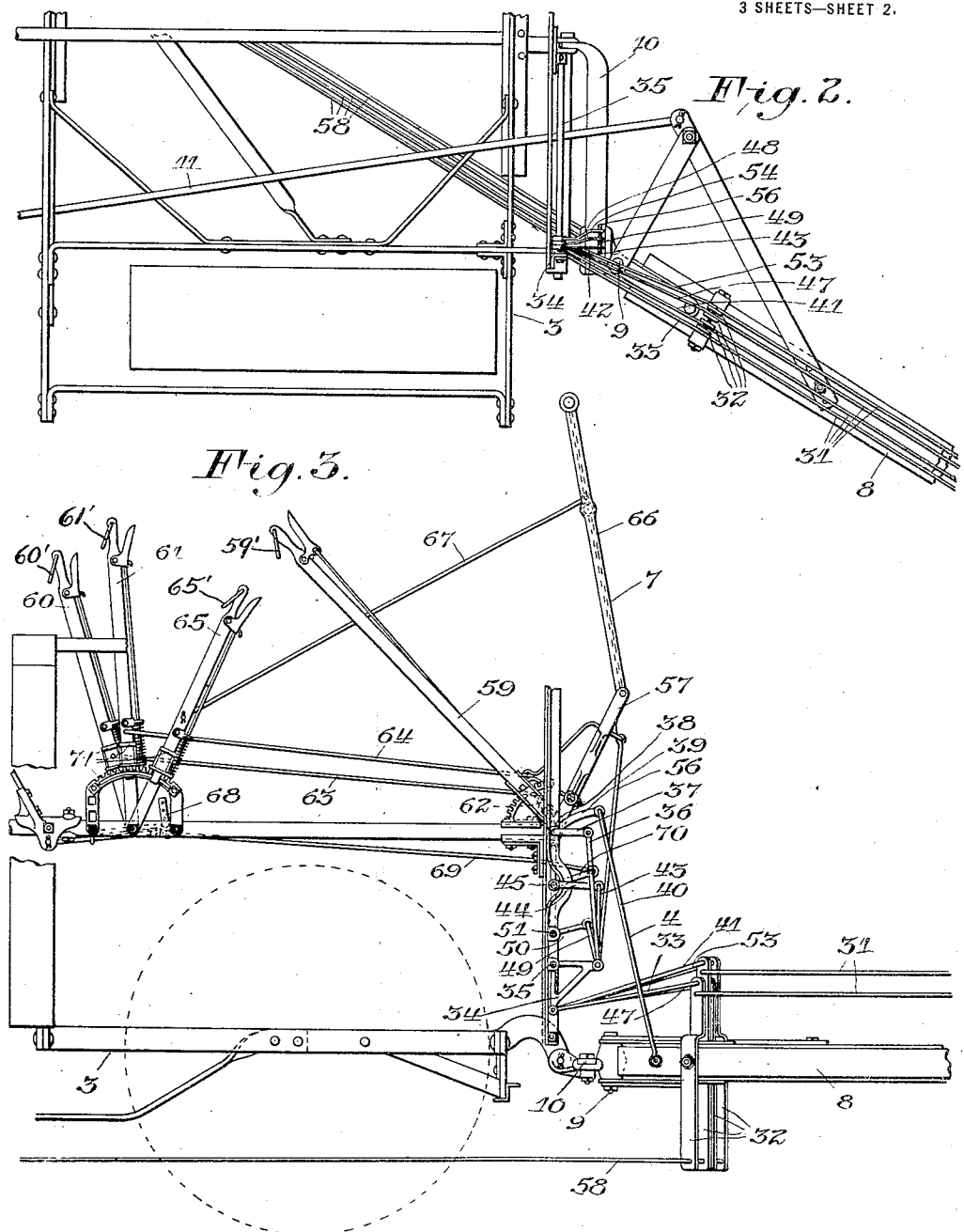

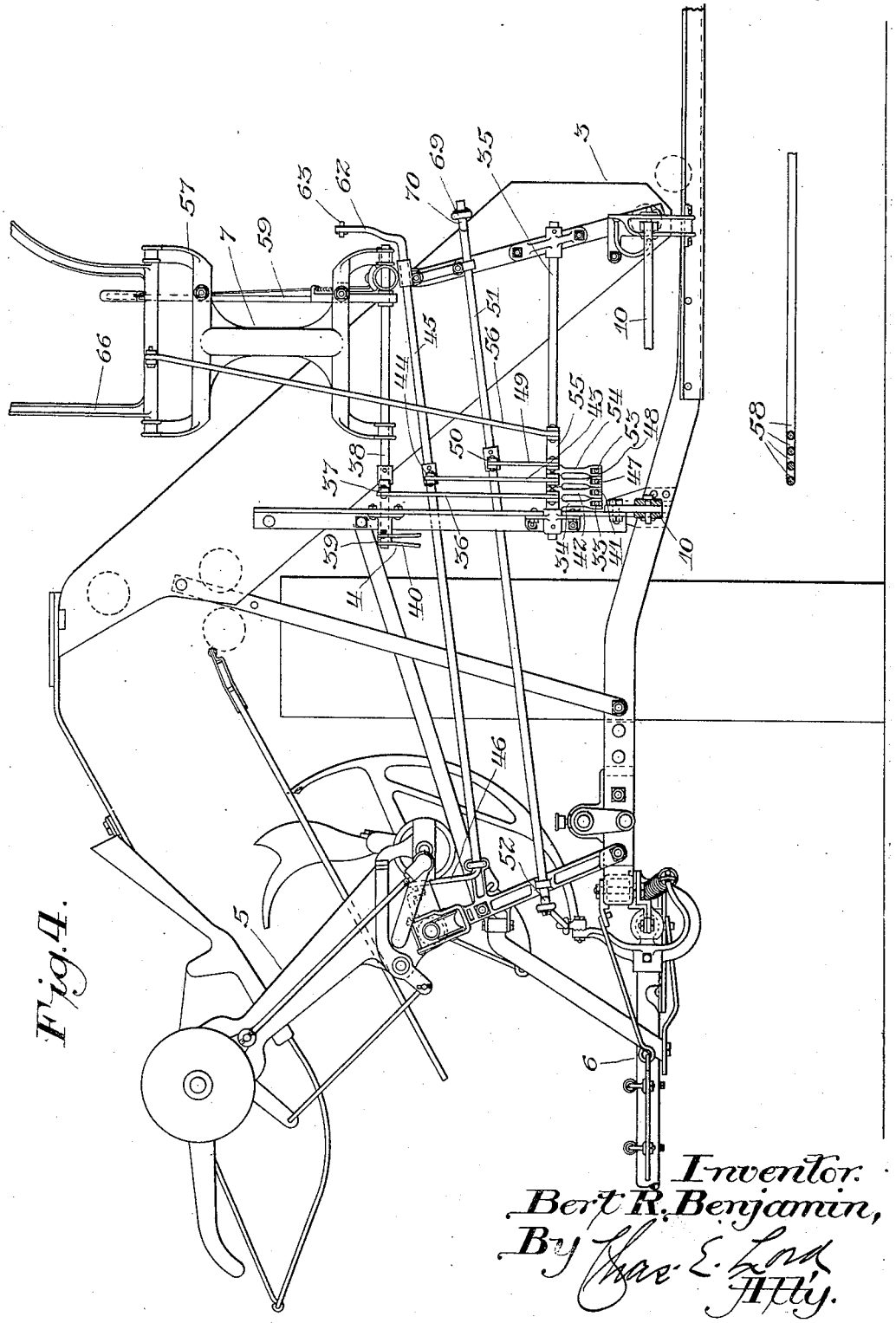

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

HARVESTING MACHINERY.

1,325,614.  Specification of Letters Patent.  Patented Dec. 23, 1919.

Application filed July 17, 1915. Serial No. 40,408.

*To all whom it may concern:*

Be it known that I, BERT R. BENJAMIN, a citizen of the United States, residing at Oak Park, in the county of Cook and State of Illinois, have invented certain new and useful Improvements in Harvesting Machinery, of which the following is a full, clear, and exact specification.

My invention relates to harvesting machinery.

It has among its objects to control in an improved manner one or more machines, such as harvesters or the like, propelled or drawn by a suitable source of power or draft; such, for instance, as a tractor, so that a single operator may control one or more of the machines as the power unit and its connected machines move down the field. A further object of my invention is to provide improved means whereby an operator on a power unit may adjust the several mechanisms of a trailing harvester, or a plurality thereof, in such a manner as to adapt the harvester or harvesters to the various grain conditions encountered as the machines move down the field, the necessity for separate operators on each machine being thereby avoided.

I preferably attain these objects by operatively connecting the power unit or tractor with the machines to be controlled through improved operative connections whereby an operator, by the manipulation of operating members by and readily accessible from the tractor, may adjust any or all of the usual controlling mechanisms on the trailing machines; such, for instance, as the tilting mechanism, the binder shifting mechanism, the bundle carrier mechanism, and the reel adjusting mechanism, these mechanisms preferably being connected to separate controlling members so that when the operator on the tractor throws one member he may in the single operation cause the same mechanism upon each of the trailing machines to be adjusted.

In order that my invention may be clearly and fully disclosed, I have, for purposes of illustration, shown one embodiment of the same in the accompanying drawings, wherein my improvement is adapted to use in connection with grain binders.

In these drawings:

Figure 1 is a plan view of my invention applied to a tractor and a plurality of operatively connected binders.

Fig. 2 is a detail plan view of the connections to one of the binders.

Fig. 3 is a side elevation, partially in section, of the mechanism of one of the binders.

Fig. 4 is a front view of the mechanism on one of the binders.

Fig. 5 is a side elevation of the adjusting mechanism operable from the tractor.

Fig. 6 is a plan view of the adjusting mechanism shown in Fig. 5.

In the embodiment of my invention shown, a tractor or other source of power is indicated diagrammatically at 1, the same having the usual platform 2 at its rear end. Disposed in offset relation with respect to the tractor, in the usual manner, are a plurality of grain binders 3, two grain binders being shown herein for purposes of illustration, although it is to be understood that the invention may be applied to more than two if desired.

Each of these grain binders 3 is equipped with its usual mechanisms, including a tilting mechanism 4 by which the platform of the binder is tilted, the adjustable binding mechanism 5 by which the bundles are bound and the position of the bands thereon is adjusted, the bundle carrier mechanism 6 by which the bundles are deposited in groups in the field, and the adjustable reel supporting mechanism 7 by which the position of the reel is adjusted to accommodate it to different grain conditions. As shown, each of the harvesters is also provided with a tongue 8, which is pivotally connected at 9 to the harvester frame so as to swing laterally relative to the line of draft, the same being also connected through a suitable supplemental frame 10 in such a manner that it may rise and fall as the machines pass over uneven ground. These tongues 8 are also adjusted laterally about their pivots 9 in any well known manner, as, for instance, by suitable adjusting mechanism 11, the tongues 8 of the trailing machines preferably being connected to arcuate, transversely disposed draft members 12 at the rear of the leading machines through suitable clevis connections 13. Of course, the tongue 8 of the first machine is pivotally connected to a suitable draw bar 14 on the tractor, this draw bar, if desired, acting against a spring 15 and moving through suitable guiding members 16 on the under side of the tractor platform 2.

In my improvement the tongue 8 of the machine directly in rear of the tractor, is pivotally connected at 17 to the tractor draw bar 14, a substantially T-shaped bracket or plate 18 preferably being fixed to the upper surface of the tongue by bolts 19. Upon this plate a plurality of upstanding levers 20, 21, 22 and 23 are pivoted, the same preferably being disposed in parallel pairs on opposite sides of the plate 18. As shown, these levers are provided with suitable cooperating sector and detent mechanism 24, 25, 26 and 27 so that they may be held in any desired position of adjustment. The controlling mechanism, therefore, which includes levers 20, 21, 22 and 23 and the plate 18 on which they are pivoted, is supported by the tractor, and is operable therefrom. Each of these levers is also provided with a downwardly extending portion 28 having a rearwardly extending, horizontally disposed link 29 pivotally connected at its lower end, and in turn connected to a pivoted upstanding link 30 pivoted on the front end of the pole. (Figs. 5 and 6.) These links 30 are each connected through a rearwardly extending rod 31 with one of a second series of normally upstanding links 32, pivoted at points intermediate their ends to the rear end of the tongue 8 and connected to the different mechanisms on the harvesters.

As shown, the link 32, which is connected to the lever 20, is connected through a rod 33 with an arm of a bell crank 34 pivoted on a cross rod 35 journaled on the front of the harvester frame. The other arm of this bell crank 34 is in turn connected through a vertically disposed link 36 with a crank 37 carried on a transverse shaft 38 which is journaled on the front of the binder frame and itself provided with a crank 39 which is connected through a link 40 with the tongue 8 in such a manner as to give the usual tilting movement to the binder. The link 32, which is connected to the lever 21, is similarly connected through a link 41 with a bell crank 42 journaled alongside the bell crank 34 on the shaft 35 and having its other arm similarly connected through a link 43 with a crank 44 on a transverse shaft 45 journaled on the front of the harvester frame at a point below the shaft 38. This shaft 45 carries upon its stubbleward end a crank 46, which is connected to the binding mechanism 5 in such a manner as, upon movement of the lever 21, to adjust the binding mechanism relative to the grain flowing over the binder deck. The link 32, which is connected to the lever 22, is connected through a link 47 similar to the link 41, with one arm of a third bell crank 48 journaled on the shaft 35 next to the bell crank 42. The other arm of the bell crank 48 is connected, through a vertically disposed link 49, with a crank 50 carried on a transverse shaft 51 journaled on the front of the harvester and below the shaft 45. As shown, this shaft 51 carries at its stubbleward end a crank 52, which is connected in a well known manner to the bundle carrier 6. The link 32 connected with the lever 23 is similarly connected through a link 53 with one arm of a fourth bell crank lever 54 disposed on the shaft 35 opposite the bell crank 48 and having an elongated grainwardly extending sleeve 55 between its arms. The other arm of this bell crank 54 is connected, through an upwardly extending link 56, with a pivoted reel support 57 of well known construction.

Connected to the lower ends of each of the upstanding links 32 through rearwardly disposed links 58 is mechanism upon the second machine corresponding with that just described, it being understood that the same controlling mechanism is preferably carried upon each machine of the trailing series, and that the same mechanism, such, for instance, as the tilting mechanism, is operated simultaneously upon each of the trailing machines when the appropriate lever on the tractor is operated. Obviously, as many harvesters may be provided as it is possible for the operator to control through the levers on the tractor, and these levers, if desired, may be so constructed and disposed as to enable the weight of the operator to be brought to bear thereon and thereby enable him to control the same with greater facility or to control a greater number of machines.

If desired, each of the several harvester mechanisms 4, 5, 6 and 7 may also be connected to the usual hand operated levers, as shown, a tilting lever 59 being fixed on the shaft 38, while the binder adjusting and reel raising and lowering levers 60 and 61, respectively, are connected to a crank 62 on the shaft 45 and the reel support 57 through link connections 63 and 64, respectively. As shown, an adjusting lever 65 may also be provided to adjust the reel back and forth, the same being preferably connected to the usual pivoted reel carrying element 66 on the reel support 57 through a link 67. As in the usual construction, a foot lever 68 for operating the bundle carrier 6 may also be connected to the bundle carrier mechanism by a link 69 extending between the lever 68 and a crank 70 on the shaft 51. Of course, the levers 60, 61 and 65 may be provided with their usual sector and detent mechanism 71. A series of looped members, 60', 61', 65' and 59', is provided on these levers for locking the detent mechanism out of operation when the adjusting mechanism controlled by these levers is to be actuated from the tractor.

In the operation of the form of my invention shown herein, before the machines start to move into the grain, it is desirable to render the detent mechanism for the manually operable adjusting levers inoperative and, then, to adjust the several machines into their desired offset relation, shown in Fig. 1, as the machines move into the grain. This last may be readily done through the adjusting mechanism 11, the tongues 8 being moved along the arcuate members 12 until the machines occupy the desired offset relation. In this position they are held by the adjusting mechanism. As the machines go down the field, the operator on the tractor will obviously be able to adjust any of the several controlling mechanisms on the trailing machines whenever it is desired to adapt them to the different grain conditions encountered. He further will be able to do so without leaving the tractor and through connections which are always supported by the tractor and maintained within his reach regardless of the angle of the tractor with respect to the machines. In making a turn the operator may obviously drive beyond the end of the grain and then swing around in a wide circle to the right or left, depending upon the type of binders being used, and bring the binders into the grain without requiring any assistance; or, if the shockers or others are handy, men may be placed upon the several harvesters while making the turn to manipulate the adjusting mechanism 11 and move the tongues 8 relative to the members 12 in a well known manner.

It will be noted that, in my improved construction, whenever it is desired to use the harvesters individually, the same may be so used upon disconnecting them from the tractor and from one another. Of course, when the machines are desired to be used permanently in connection with a tractor, certain or all of the manual adjusting levers thereon and their connections may be omitted. When automatic shockers, as, for instance, those of the Raney or other desirable type, are used, the bundle carrier mechanism shown herein will also be omitted, and when the invention is adapted to use in connection with a corn binder, the reel adjusting mechanism will likewise be unnecessary. It will, of course, also be obvious that, should it be desirable, my improved mechanism, instead of being operated by the operator, may be connected to the tractor in any suitable manner so that the power for shifting the mechanisms is furnished by the tractor and only controlled by the operator. That the machines may be controlled, in certain embodiments of my invention, from a point on one of the harvesters instead of on the tractor, will, of course, also be understood.

While I have in this application specifically described one embodiment which my invention may assume in practice, it is, of course, to be understood that this embodiment is used for purposes of illustration and that the invention itself is not limited thereto but may assume various other forms, all of which it is my intention to include within the scope of the appended claims.

What I claim as my invention and desire to secure by Letters Patent is:

1. In combination, a harvester, harvesting mechanism carried thereby, means carried by said harvester for controlling said harvesting mechanism, a tractor operatively connected to said harvester, controlling mechanism supported by said tractor, and positive connections between said last named controlling mechanism and the controlling means on said harvester whereby the latter may be positively operated in a plurality of directions.

2. In combination, a harvester, harvesting mechanism carried thereby, means carried by said harvester for controlling said harvesting mechanism, a tractor, a draft member connecting said harvester and tractor, controlling mechanism supported by said tractor, and positive connections between said last named controlling mechanism and the controlling means on said harvester, for positively operating the latter in a plurality of directions, said positive connections being carried by said draft member.

3. In combination, a plurality of operatively connected harvesters, harvesting mechanism carried by said harvesters, controlling mechanism for the harvesting mechanism on each harvester, and means whereby said controlling mechanisms may be controlled from a single point.

4. In combination, a plurality of operatively connected harvesters disposed in offset relation, and means whereby operating parts of a plurality thereof may be controlled from a single point.

5. In combination, a tractor, a plurality of harvesters operatively connected thereto and disposed in offset relation, and control means supported by and operable from the tractor for controlling the operating parts of said harvesters.

6. In combination, a tractor, a plurality of harvesters operatively connected thereto and disposed in offset relation, and control means supported by and operable from the tractor for simultaneously controlling the operating parts of a plurality of said harvesters.

7. In combination, a harvester, a plurality of adjustable controlling mechanisms carried thereby, a tractor, and means supported by said tractor and positively connected to said controlling mechanisms for adjusting said mechanisms in a plurality of directions.

8. In combination, a plurality of operatively connected harvesters, a plurality of adjustable controlling mechanisms on each of the same, and operatively connected means for controlling corresponding mechanisms on said harvester.

9. In combination, a plurality of operatively connected harvesters, a plurality of adjustable controlling mechanisms on each of the same, and means for simultaneously adjusting corresponding mechanisms on said harvesters.

10. In combination, a tractor, a plurality of operatively connected binders operatively connected thereto, binder controlling mechanism on said binders, and means operatively connected to said tractor and operable from a single point for controlling said mechanisms.

11. In combination, a tractor, a plurality of binders, tandem draft connections between said binders and said tractor, and means operable from said tractor and carried upon said binders and connections for controlling all of said binders.

12. In combination, a tractor, a plurality of operatively connected binders operatively connected thereto, controlling mechanism on said binders, and means for controlling said mechanism including a support pivoted to said tractor and a plurality of operating members thereon operable from the rear end of said tractor.

13. In combination, a power unit, a plurality of harvesters operatively connected thereto and disposed in off-set relation, bundle carrier, tilting and binder adjusting mechanism carried on each of said harvesters, and remote control means supported by said power unit whereby any one of said mechanisms on each harvester may be adjusted from said power unit.

14. In combination, a power unit, a plurality of harvesters, tandem draft connections between the same and said power unit whereby said harvesters may be disposed in offset relation, adjustable controlling mechanism by said harvesters, and remote control means supported by and operable from said power unit for controlling said mechanism on any one of said harvesters.

15. In combination, a power unit, a plurality of harvesters, tandem draft connections between the same and said power unit whereby said harvesters may be disposed in offset relation, adjustable controlling mechanism on said harvesters, and remote control means supported by and operable from said power unit for controlling said mechanism on a plurality of harvesters.

16. In combination, a power unit, a plurality of harvesters, tandem draft connections between the same and said power unit whereby said harvesters may be disposed in offset relation, adjustable controlling mechanism on said harvesters, and remote control means supported by and operable from said power unit for controlling said mechanism on one of said harvesters beyond that connected to said power unit.

17. In combination, a power unit, a plurality of harvesters, operative connections between said harvesters and power unit whereby said harvesters may be disposed in offset relation, bundle carrier mechanism on said harvesters, and remote controlling mechanism supported by and operable from said power unit for controlling the bundle carrier mechanism on a plurality of harvesters.

18. In combination, a power unit, a plurality of harvesters, operative connections between said harvesters and power unit whereby said harvesters may be disposed in offset relation, tilting mechanism on said harvesters, and remote controlling mechanism supported by and operable from said power unit for controlling the tilting mechanism on a plurality of harvesters.

19. In combination, a power unit, a plurality of harvesters, operative connections between said harvesters and power unit whereby said harvesters may be disposed in offset relation, binder adjusting mechanism on said harvesters, and remote controlling mechanism supported by and operable from said power unit for controlling the binder adjusting mechanism on a plurality of harvesters.

20. In combination, a power unit, a plurality of harvesters, operative connections between said harvesters and power unit whereby said harvesters may be disposed in offset relation, reel adjusting mechanism on said harvesters, and remote controlling mechanism supported by and operable from said power unit for controlling the reel adjusting mechanism on a plurality of harvesters.

21. In combination, a tractor, a plurality of binders, tandem draft mechanism whereby said binders are connected to said tractor and movable into offset relation in rear thereof, and flexible controlling mechanism operable in any position of said tandem draft connections for controlling said binders from said tractor in various positions of said binders with respect to said tractor.

22. In combination, a tractor, a plurality of binders, controlling mechanism thereon, operative connections between said binders and said tractor comprising swinging tongues adjustable transversely relative to the line of draft, and remote means operable from said tractor for controlling the controlling mechanism on certain of said binders in any position of adjustment of said tongues.

23. In combination, a tractor, a binder operatively connected thereto, bundle carrier mechanism on said binder, means on said binder for operating said bundle carrier, and means supported by and operable from said tractor for positively controlling said first named means.

24. In combination, a tractor, a binder operatively connected thereto, reel adjusting mechanism on said binder, means supported by and operable from said tractor for operating said reel adjusting mechanism, and positive connections between said last named means and said reel adjusting mechanism whereby said reel may be positively adjusted in a plurality of directions.

25. In combination, a tractor, a binder, a draft member connecting said tractor and binder, binder shifting mechanism on said binder, and means carried by said draft member adjacent said tractor for operating said binder shifting mechanism from the tractor.

26. In combination, a tractor, a binder, a draft member connecting said tractor and binder, platform tilting mechanism on said binder, means supported by and operable from said tractor for actuating said tilting mechanism, and connecting means between said last named means and said tilting mechanism said connecting means being supported by said draft member.

27. In combination, a binder, controlling mechanism thereon, manually operable adjusting means for the latter comprising a plurality of levers operatively connected to said controlling mechanisms, a tractor operatively connected to said binder, and supplemental means supported by said tractor and positively connected to said controlling mechanisms whereby the adjustment of the latter may be controlled from said tractor.

28. In combination, a binder, controlling mechanisms thereon, a shaft carried on said binder, a plurality of bell cranks carried on said shaft and nested close together thereon, operative connections between said bell cranks and said controlling mechanisms and means for operating said bell cranks from a single point remote from the binder to actuate said controlling mechanisms.

29. In combination, a plurality of binders, tandem draft connections between the same including transversely movable swinging tongues pivoted on each of the same and connected to the leading machine, a tractor operatively connected to the tongue on one of said binders, controlling mechanism on each of said binders, actuating means for said controlling mechanism including a plurality of bell cranks carried on each binder and operatively connected to said controlling mechanism, and means operable from said tractor and carried on said tongue for operating said actuating means on each of said binders.

30. In combination, a harvester, harvesting mechanism carried thereby, levers for adjusting said harvesting mechanism, a tractor, levers supported thereby, and positive connections between said two sets of levers whereby the harvesting mechanism may be positively adjusted in a plurality of directions from said tractor.

31. In combination, a harvester, a plurality of adjustable controlling mechanisms carried thereby, a tractor, an adjustable draft member operatively connecting said harvester and said tractor, and means supported on said draft member for positively adjusting said controlling mechanism on said harvester, said means being operable in a plurality of positions of adjustment of said draft member.

32. In combination, a plurality of independent harvesters connected in trailing relation, each of said harvesters including supporting wheels, an axle carried thereby and a frame carried by said axle, draft means for connecting said harvesters together, means for tilting one of said harvester frames on its axle, and means for tilting another of said harvester frames controlled by the tilting of the first-named harvester frame.

33. In combination, a plurality of harvesters connected together in trailing relation, each of said harvesters including supporting wheels, an axle carried thereby and a frame carried by said axle, means for connecting said harvesters together, means for tilting one of said harvester frames on its axle, and means controlled by the tilting of said first-named harvester frame for simultaneously tilting another of said harvester frames on its axle and through the same angle of movement.

34. In combination, a plurality of independent harvesters, draft means for connecting said harvesters together in trailing relation, means for tilting one of said harvesters, and means connecting said harvesters whereby as the first harvester is tilted the remaining harvesters will be simultaneously tilted.

35. In combination, a plurality of independent harvesters, means for connecting said harvesters together in trailing relation, means for tilting one of said harvesters, and means connecting said harvesters whereby as the first harvester is tilted through an angle of movement, the remaining harvesters will be simultaneously tilted through the same angle of movement.

36. In combination, a plurality of independent harvesters connected in trailing relation, means for connecting said harvesters together, tilting mechanism on one of said harvesters, and a connection between another of said harvesters and the tilting mechanism of the first-named harvesters, and means for tilting the harvester so connected.

37. In combination, a tractor, a plurality of independent harvester units drawn by said tractor and connected thereto, means for connecting said units together in trailing relation, means operable from the seat of the tractor for tilting one of said units, and means connecting said units whereby as said first-named unit is tilted from the tractor the remaining units will be simultaneously tilted.

38. In combination, a tractor, a plurality of harvesters having bundle carriers, said harvesters being connected to each other and operatively connected to the tractor, means for simultaneously tilting said harvesters from the tractor, and means for controlling the operation of said bundle carriers from the tractor.

In testimony whereof I affix my signature.

BERT R. BENJAMIN.